US011890576B2

(12) United States Patent
Chen et al.

(10) Patent No.: US 11,890,576 B2
(45) Date of Patent: Feb. 6, 2024

(54) GAS CAPTURE SYSTEM

(71) Applicant: FJELL BIODRY AS, Bergen (NO)

(72) Inventors: De Chen, Trondheim (NO); Kumar Ranjan Rout, Trondheim (NO); Asbjørn Strand, Bergen (NO)

(73) Assignee: FJELL BIODRY AS, Bergen (NO)

( * ) Notice: Subject to any disclaimer, the term of this patent is extended or adjusted under 35 U.S.C. 154(b) by 920 days.

(21) Appl. No.: 16/491,523

(22) PCT Filed: Mar. 8, 2018

(86) PCT No.: PCT/EP2018/055828
§ 371 (c)(1),
(2) Date: Sep. 5, 2019

(87) PCT Pub. No.: WO2018/162675
PCT Pub. Date: Sep. 13, 2018

(65) Prior Publication Data
US 2020/0016537 A1   Jan. 16, 2020

(30) Foreign Application Priority Data
Mar. 8, 2017  (GB) ..................... 1703719

(51) Int. Cl.
*B01D 53/96*   (2006.01)
*B01D 53/62*   (2006.01)
(Continued)

(52) U.S. Cl.
CPC ............ *B01D 53/96* (2013.01); *B01D 53/52* (2013.01); *B01D 53/62* (2013.01); *B01D 53/83* (2013.01);
(Continued)

(58) Field of Classification Search
CPC ........ B01D 53/96; B01D 53/52; B01D 53/62; B01D 53/83; B01D 2251/404;
(Continued)

(56) References Cited

U.S. PATENT DOCUMENTS 3,781,408 A  * 12/1973  Lin ..................... B01D 53/8609
                                                    423/244.02
4,019,316 A  *  4/1977  Pfefferle .................. F23R 3/40
                                                         60/777
(Continued)

FOREIGN PATENT DOCUMENTS

CN         202478779 U      10/2012

OTHER PUBLICATIONS

Meyer, J, et al., "Sustainable Hydrogen Production from Biogas Using Sorption-Enhanced Reforming," Energy Procedia 63, Dec. 2014, 6800-6814.

(Continued)

*Primary Examiner* — Anita Nassiri-Motlagh
(74) *Attorney, Agent, or Firm* — Christensen O'Connor Johnson Kindness PLLC (57) ABSTRACT

Disclosed herein is a method of regenerating a sorbent of gas in a capture process of said gas, wherein the capture process comprises recirculating the sorbent between a gas capturing system and regenerating reactor system, the method comprising the regenerating reactor system performing the steps of: receiving a solid sorbent to be regenerated, wherein the sorbent is a sorbent of carbon dioxide gas; generating heat by combusting a fuel with an oxidising agent in the presence of a catalyst; regenerating the sorbent by using the generated heat to indirectly heat the sorbent so that the sorbent releases carbon dioxide gas; outputting the regenerated sorbent; and (Continued)

outputting the released carbon dioxide gas. Advantages of the gas capture system include a higher efficiency than known techniques.

18 Claims, 7 Drawing Sheets

(51) Int. Cl.
  *B01D 53/83* (2006.01)
  *B01J 8/08* (2006.01)
  *B01J 20/34* (2006.01)
  *C01B 3/56* (2006.01)
  *B01D 53/52* (2006.01)
  *B01J 23/755* (2006.01)
  *F23C 13/08* (2006.01)

(52) U.S. Cl.
  CPC ........... *B01J 8/087* (2013.01); *B01J 20/3433* (2013.01); *B01J 20/3483* (2013.01); *B01J 23/755* (2013.01); *C01B 3/56* (2013.01); *F23C 13/08* (2013.01); *B01D 2251/404* (2013.01); *B01D 2257/304* (2013.01); *B01D 2257/504* (2013.01); *B01D 2258/025* (2013.01); *B01D 2258/0233* (2013.01); *B01D 2258/0283* (2013.01); *B01J 2208/00132* (2013.01); *B01J 2208/00504* (2013.01); *C01B 2203/043* (2013.01); *C01B 2203/0475* (2013.01)

(58) Field of Classification Search
  CPC ........ B01D 2257/304; B01D 2257/504; B01D 2258/0233; B01D 2258/025; B01D 2258/0283; B01J 8/087; B01J 20/3433; B01J 20/3483; B01J 23/755; B01J 2208/00132; B01J 2208/00504; C01B 3/56; C01B 2203/043; C01B 2203/0475; F23C 13/08
  USPC ............................................................ 95/148
  See application file for complete search history.

(56) References Cited

U.S. PATENT DOCUMENTS

| | | |
|---|---|---|
| 4,692,318 A | 9/1987 | Tolpin et al. |
| 2009/0263316 A1* | 10/2009 | Iyer .................... C01B 3/386 423/658.3 |
| 2010/0196259 A1* | 8/2010 | Garg .................... B01D 53/62 96/108 |
| 2011/0286902 A1 | 11/2011 | Fan et al. |
| 2014/0102343 A1 | 4/2014 | Stallmann et al. |

OTHER PUBLICATIONS

Abanades, J.C., et al., "Fluidized Bed Combustion Systems Integrating $CO_2$ Capture With CaO," Environmental Science & Technology 39(8):2861-2866, Apr. 2005.

GB Search Report dated May 8, 2017, issued in Application No. GB1703719.3, filed Mar. 8, 2017, 1 page.

International Search Report dated Jul. 20, 2018, issued in corresponding International Application No. PCT/EP2018/055828, filed Mar. 8, 2018, 3 pages.

* cited by examiner

GAS CAPTURE SYSTEM

FIELD

The present disclosure relates to gas capture systems and processes. In a particularly preferred embodiment, a gas capture system is provided that comprises a circulating bed of high temperature solid sorbent for capturing a gas. Embodiments are particularly appropriate in a post combustion carbon dioxide capture system that reduces the amount of carbon dioxide in flue gas. Advantages of the gas capture system include a higher efficiency than known techniques.

BACKGROUND

Fossil fuel-fired power plants are necessary for meeting the global energy demand. However, there is a lot of environmental pressure to reduce the emissions of carbon dioxide gas into the atmosphere.

Known technology for greatly reducing the carbon dioxide released into the atmosphere due to the combustion of fossil fuels is carbon capture and storage, CCS. CCS technologies include pre-combustion carbon dioxide capture and post-combustion carbon dioxide capture, PCCC. A PCCC system removes carbon dioxide from the flue gas generated by carbon dioxide combustion prior to the flue gas being released into the atmosphere. Providing a PCCC system is the only way of retrofitting an existing fuel fuel-fired power plant so that CCS is implemented. Effective implementations of PCCC systems are therefore necessary for the continued use of existing fossil fuel-fired power plants without there being an undue increase in the release of carbon dioxide into the atmosphere. New fossil fuel-fired power plants should also be constructed with a PCCC system.

In a PCCC system, a sorbent is used to adsorb carbon dioxide from flue gas that has been generated by fossil fuel combustion. The implementation of the PCCC system is highly dependent on the sorbent that is used. The sorbent may be a fluid, such as monoethanolamine, MEA. PCCC systems that use fluid sorbents are appropriate for low temperature carbon dioxide capture applications. Problems experienced by fluid sorbents are low energy efficiency and high cost. In addition, there are also environmental concerns resulting from the general use of amines.

The use of solid sorbents is preferable over fluid sorbents because the energy efficiency is improved and the above-identified environmental concerns are avoided. The three classes of solid sorbents are defined by the carbonation temperatures at which they absorb carbon dioxide. Low-temperature solid sorbents have a carbonation temperature below 200° C., intermediate-temperature solid sorbents have a carbonation temperature between 200° C. to 400° C., and high-temperature solid sorbents have a carbonation temperature above 400° C. It is known to use carbon, zeolites and polymers as low temperature solid sorbents. It is known to us the K- and Na oxides, and hydrotalcite materials as intermediate temperature sorbents. It is known to use alkaline oxides, such as calcium oxide and MgO, as a high temperature solid sorbent.

It is known for carbon dioxide capture by a high temperature solid sorbent to be performed by a pressure swing adsorption, PSA, process that requires substantial pressure differences within the system in order for the sorbent to capture carbon dioxide and to be regenerated. Such systems are implemented with a fixed bed reactor. Problems with fixed bed reactors for gas capture applications include the capital cost being high and the reactors not being suitable for the capture of large volumes of gas.

It is known for a fluid sorbent to be circulated around a PCCC system in a temperature swing, TSA, gas capture process. The sorbent is used to capture the carbon dioxide to from the flue gas and the flue gas is output from the system with a reduced carbon dioxide content. The sorbent is then regenerated in a process that causes the sorbent to release the captured carbon dioxide and the carbon dioxide is output from the system without being released into the atmosphere. The regenerated sorbent is then reused to capture carbon dioxide from flue gas. The PCCC system can therefore be operated continuously with the sorbent cycling round the system. However, known implementations of systems in which a fluid sorbent is used are inefficient as the retention time of the fluid sorbent within the components of the system where the gas is captured and the sorbent is regenerated is difficult to control and low.

The regeneration of the sorbent is an endothermic process and it is necessary to provide heat for the regeneration to occur. It is known for the heat required for the regeneration of the sorbent to be provided via direct or indirect heating. In direct heating the sorbent is exposed to the combustion reaction that generates the heat. The combustion reaction comprises an oxidising agent reacting with a carbonaceous fuel. A problem with the direct heating of the sorbent is that the carbon dioxide that is released during the regeneration process is mixed with the products of the combustion process. Therefore, in order to avoid dilution of the carbon dioxide with inert gases, the heat is preferably generated by burning a carbonaceous fuel in either pure oxygen or a mixture of air and concentrated oxygen. A disadvantage of this approach is that the production of oxygen for use as oxidant in the calcinator is expensive.

In indirect heating, the sorbent is separated from the combustion process that generates the heat. The sorbent is therefore not mixed with the products of the combustion process. In known systems with indirect heating, the heat is generated by burning a carbonaceous fuel in air. A high air/fuel ratio is required to keep the temperatures inside the indirect heating system in an acceptable range for standard construction materials. The oxygen is partly combusted but the bulk rest of the gases do not react. This generates a large additional amount of flue gas that also needs to be cleaned.

There is a need to improve known CCS systems. More generally, there is a need to improve gas capture systems across a plurality of applications, including the capture of gases other than carbon dioxide.

SUMMARY

According to a first aspect of the invention, there is provided a method of regenerating a sorbent of gas in a capture process of said gas, wherein the capture process comprises recirculating the sorbent between a gas capturing system and regenerating reactor system, the method comprising the regenerating reactor system performing the steps of: receiving a solid sorbent to be regenerated, wherein the sorbent is a sorbent of gas; generating heat by combusting a fuel with an oxidising agent in the presence of a catalyst; regenerating the sorbent by using the generated heat to indirectly heat the sorbent so that the sorbent releases said gas; outputting the regenerated sorbent; and outputting the released gas.

Preferably, the regenerating reactor system comprises: a sorbent input that receives the sorbent; and a sorbent output that outputs the regenerated sorbent.

Preferably, said step of regenerating the sorbent by indirectly heating the sorbent comprises indirectly heating the sorbent as it moves from the sorbent input to the sorbent output.

Preferably, the sorbent is a sorbent of carbon dioxide gas; and said step of regenerating the sorbent by indirectly heating the sorbent comprises the sorbent releasing carbon dioxide gas.

Preferably, the received sorbent comprises a metal carbonate, preferably calcium carbonate, and the regenerated sorbent comprises a metal oxide, preferably calcium oxide.

Preferably, the received sorbent and the regenerated sorbent both comprise a metal carbonate and a metal oxide; the amount of the metal carbonate in the received sorbent is greater than in the regenerated sorbent; and the amount of the metal oxide in the received sorbent is less than in the regenerated sorbent.

Preferably, the sorbent comprises a binding agent.

Preferably, the sorbent comprises natural and/or synthetic mixed metal oxides, preferably calcium oxide.

Preferably, the sorbent is a sorbent of hydrogen sulfide gas; and said step of regenerating the sorbent by indirectly heating the sorbent comprises the sorbent releasing hydrogen sulfide gas.

Preferably, the sorbent comprises a plurality of different sorbents for a respective plurality of different gases; and the capture process comprises capturing a plurality of different gases.

Preferably, the sorbent is a high temperature sorbent.

Preferably, in said step of generating heat by combusting a fuel with an oxidising agent in the presence of a catalyst, substantially pure oxygen is not input to the combustion process.

Preferably, the fuel is a carbonaceous based fuel.

Preferably, the fuel comprises one or more of methane, natural gas, syngas, biogas, gasified coal and coal dust.

Preferably, the oxidising agent is a gas comprising Oxygen, such as air.

Preferably, the oxidising agent is a carbonaceous gas that comprises Oxygen, such as flue gas.

Preferably, the catalyst comprises one or more of Ni, Co, Ru, Rh, Pd and Pt, the catalyst preferably being a Ni and Co mixture.

Preferably, the combustion of the fuel with the oxidising agent is total combustion.

Preferably, the regenerating reactor system comprises a moving bed reactor.

Preferably, the regenerating reactor system comprises a fluidised bed reactor.

Preferably, the regenerating reactor system comprises a plurality of tubes that provide heat to the regenerating reactor system; and the sorbent travels around the outside the tubes as it moves from the sorbent input to the sorbent output.

Preferably, the tubes are each elongate and substantially linear.

Preferably, the tubes are aligned substantially horizontally.

Preferably, the step of generating heat by combusting a fuel with an oxidising agent in the presence of a catalyst is performed inside the tubes.

Preferably, at least some of the inner surfaces of the tubes are coated with the catalyst.

Preferably, the tubes are comprised by a housing of the regenerating reactor system.

Preferably, the fuel and/or oxidising agent is input into an end of each of the tubes.

Preferably, the regenerating reactor system comprises a plurality of tubes; each of the plurality of tubes are connected at one of their ends to the sorbent input and the other of their ends to the sorbent output; and the sorbent travels in the inside the tubes as it moves from the sorbent input to the sorbent output.

Preferably, the tubes are each elongate and substantially linear.

Preferably, the tubes are aligned substantially vertically.

Preferably, the step of generating heat by combusting a fuel with an oxidising agent in the presence of a catalyst is performed outside of the tubes.

Preferably, at least some of the outer surfaces of the tubes are coated with the catalyst.

Preferably, the tubes are comprised by a housing of the regenerating reactor system and at least some of the inner surface of the housing is coated with the catalyst.

Preferably, the regenerating reactor system comprises one or more fuel and/or oxidising agent inputs for receiving the fuel and/or oxidising agent; and one or more exhaust outputs for outputting combusted fuel from the regenerating reactor system.

Preferably, the regenerating reactor system comprises a first system and a second system that is separate from the first system; the step of generating heat by combusting a fuel with an oxidising agent in the presence of a catalyst is performed by the first system; the step of regenerating the sorbent is performed by the second system; and the method comprises transferring heat from the first system to the second system.

Preferably, heat is transferred from the first system to the second system by a heat loop wherein the heat loop preferably comprises one or more of liquefied helium, air, carbon dioxide or sodium.

Preferably, the regenerating reactor system comprises a rotating drum and/or a stack of staggered plates.

Preferably, the step of regenerating the sorbent comprises heating the sorbent to a temperature in the range 750° C. to 1000° C., preferably a temperature in the range 800° C. to 950° C., more preferably to a temperature of approximately 900° C.

According to a second aspect of the invention, there is provided a regenerating reactor system for regenerating a sorbent of gas in a gas capture system, wherein the gas capture system is configured to capture said gas by recirculating the sorbent between a gas capturing system and the regenerating reactor system, wherein the regenerating reactor system comprises: a sorbent input for receiving a solid sorbent to be regenerated, wherein the sorbent is a sorbent of gas; a combustor for generating heat by combusting a fuel with an oxidising agent in the presence of a catalyst; a reactor for regenerating the sorbent by using the heat generated by the combustor to indirectly heat the sorbent so that the sorbent releases said gas; a sorbent output for outputting the regenerated sorbent; and a gas output for outputting the released gas.

Preferably, the reactor is configured to regenerate the sorbent as the sorbent moves through the reactor.

Preferably, the sorbent is a sorbent of carbon dioxide gas; and the sorbent releases carbon dioxide gas when it is regenerated.

Preferably, the received sorbent comprises a metal carbonate, preferably calcium carbonate, and the regenerated sorbent comprises a metal oxide, preferably calcium oxide.

Preferably, the received sorbent and the regenerated sorbent both comprise a metal carbonate and a metal oxide; the amount of the metal carbonate in the received sorbent is greater than in the regenerated sorbent; and the amount of the metal oxide in the received sorbent is less than in the regenerated sorbent.

Preferably, the sorbent comprises a binding agent.

Preferably, the sorbent comprises natural and/or synthetic mixed metal oxides, preferably calcium oxide.

Preferably, the sorbent is a sorbent of hydrogen sulfide gas; and the sorbent releases hydrogen sulfide gas when it is regenerated.

Preferably, the sorbent comprises a plurality of different sorbents for a respective plurality of different gases; and the gas capture system is configured to capture a plurality of different gases.

Preferably, the sorbent is a high temperature sorbent.

Preferably, substantially pure oxygen is not input to the combustor.

Preferably, the fuel is a carbonaceous based fuel.

Preferably, the fuel comprises one or more of methane, natural gas, syngas, biogas, gassified coal and coal dust.

Preferably, the oxidising agent is a gas comprising Oxygen, such as air.

Preferably, the oxidising agent is a carbonaceous gas that comprises Oxygen, such as a flue gas.

Preferably, the catalyst comprises one or more of Ni, Co, Ru, Rh, Pd and Pt, the catalyst preferably being a Ni and Co mixture.

Preferably, the combustion of the fuel with the oxidising agent by the combustor is total combustion.

Preferably, the reactor comprises a moving bed reactor.

Preferably, the reactor comprises a fluidised bed reactor.

Preferably: the reactor comprises a plurality of tubes that provide heat to the regenerating reactor system; and the tubes are arranged so that, in use, the sorbent travels around the outside of the tubes as the sorbent moves from the sorbent input to the sorbent output.

Preferably, the tubes are each elongate and substantially linear.

Preferably, the tubes are aligned substantially horizontally.

Preferably, the combustor is configured to combust the fuel with the oxidising agent in the presence of a catalyst inside of the tubes.

Preferably, at least some of the inner surfaces of the tubes are coated with the catalyst.

Preferably: the reactor comprises a plurality of tubes; each of the plurality of tubes are connected at one of their ends to the sorbent input and the other of their ends to the sorbent output; and the sorbent travels in the inside the tubes as it moves from the sorbent input to the sorbent output.

Preferably, the tubes are each elongate and substantially linear.

Preferably, the tubes are aligned substantially vertically.

Preferably, the combustor is configured to combust the fuel with the oxidising agent in the presence of a catalyst outside of the tubes.

Preferably, at least some of the outer surfaces of the tubes are coated with the catalyst.

Preferably: the system comprises a housing; the tubes are comprised by the housing; and at least some of the inner surface of the housing is coated with the catalyst.

Preferably, the combustor comprises one or more fuel and/or oxidising agent inputs for receiving the fuel and/or oxidising agent; and one or more exhaust outputs for outputting combusted fuel by the combustor.

Preferably, the system comprises a housing; and the reactor and combustor are comprised by the housing.

Preferably, the reactor is separate from the combustor; and the system comprises conduits for carrying a fluid between the reactor and combustor so as to transfer heat from the reactor to the combustor.

Preferably, the fluid is one or more of liquefied helium, air, carbon dioxide or sodium.

Preferably, the reactor comprises a rotating drum and/or a stack of staggered plates.

Preferably, the combustor is configured to heat the sorbent in the reactor to a temperature in the range 750° C. to 1000° C., preferably a temperature in the range 800° C. to 950° C., more preferably to a temperature of substantially 900° C.

According to a third aspect of the invention, there is provided a gas capture system for cleaning a gas by capturing a gas from a mixture of a plurality of gases, the system comprising: a gas input arranged to receive a mixture of a plurality of gases; a gas capturing system configured to clean the received mixture of a plurality of gases by using a sorbent to capture a gas within the received mixture of a plurality of gases; an output arranged to output gas that has been cleaned by the gas capturing system; a regenerating reactor system according to the second aspect, wherein the regenerating reactor system is configured to receive sorbent that has been used to capture a gas within the received mixture of a plurality of gases in the gas capturing system, regenerate the sorbent so that the sorbent releases the captured gas and output the regenerated sorbent; an output arranged to output the released gas during the regeneration of the sorbent by the regenerating reactor system; and a conduit that is arranged to provide a return path of the sorbent output from the regenerating reactor system to the input of the gas capturing system such that the sorbent is recirculated around the gas capture system; wherein the sorbent is a solid.

Preferably, the gas capturing system comprises a moving bed reactor.

Preferably, the gas capturing system comprises a fluidised bed reactor.

Preferably, the gas capturing system is configured such that the flow of the sorbent in the gas capturing system is in contraflow with the flow of the received mixture of a plurality of gases in the gas capturing system.

Preferably, the conduit that is arranged to provide a return path of the sorbent is a riser.

Preferably, the system further comprises one or more conduits that are arranged to provide a flow path of gas from an exhaust output of the combustor of the regenerating reactor system into the gas capturing system.

Preferably, the flow path of gas from an exhaust output of the combustor of the regenerating reactor system into the gas capturing system comprises one or more gas turbine, heat exchanger or burner.

Preferably, the system further comprises a heat exchanger system arranged to transfer heat between sorbent output from the regenerating reactor system and sorbent input to the regenerating reactor system.

Preferably, the system further comprises a heat exchanger system arranged to transfer heat between gas output from the regenerating reactor system and fuel for a burner and/or the combustor of the regenerating reactor system.

Preferably, the system further comprises one or more conduits that are arranged to provide a flow path of gas from an exhaust output of the combustor of the regenerating reactor system into the return path of the sorbent output from the regenerating reactor system.

Preferably, the system further comprises one or more conduits that are arranged to provide a flow path of the released gas during the regeneration of the sorbent that is output from the regenerating reactor system to the sorbent input of the regenerating reactor system such that the sorbent that is input to the regenerating reactor system is heated by the gas.

Preferably, the system further comprises a heat exchanger in said flow path of the released gas during the regeneration of the sorbent that is output from the regenerating reactor system to the sorbent input of the regenerating reactor system; wherein the heat exchanger is arranged to exchange heat between sorbent that has been output from the regenerating reactor system and the gas in the flow path.

Preferably, the gas capture system is a post-combustion carbon dioxide capture system.

Preferably, the gas capture system is configured to capture flue gas from a power plant.

Preferably, the gas capture system is a sour gas capture system.

According to a fourth aspect of the invention there is provided a method of cleaning a gas by a gas capture system, the method comprising: receiving a mixture of a plurality of gases; cleaning, by a gas capturing system, the received mixture of a plurality of gases by using a sorbent to capture a gas within the received mixture of a plurality of gases; outputting gas that has been cleaned; regenerating the sorbent according to the first aspect; outputting released gas during the regeneration of the sorbent; and returning sorbent that has been regenerated to the gas capturing system such that the sorbent is recirculated around the gas capture system; wherein the sorbent is a solid.

DESCRIPTION

Embodiments of the invention provide a gas capture system and method that solve one or more of the above-identified problems with known gas capture technology.

Embodiments include techniques for carbon dioxide capture by a PCCC system. The PCCC system may be retrofitted to an existing fossil fuel-fired power plant. Alternatively, the PCCC system may be either integrated into the design of a new fossil fuel-fired power plant or provided with a new fossil fuel-fired power plant in the same way as if the PCCC system was being retrofitted to an existing fossil fuel-fired power plant.

According to particularly preferred embodiments, a new design of PCCC system is provided that uses a high temperature solid sorbent. The system comprises moving bed, or fluidised bed, reactors as carbonators and sorbent regenerators. The sorbent is circulated around the system between a gas capture process in the carbonator and a captured gas release process in the sorbent regenerator. The carbonation and regeneration processes within the system are based on a temperature swing and not a pressure swing. That is to say, there is a substantial temperature difference between the carbonation and regeneration processes of the sorbent but the pressure differences are not substantial.

The type of sorbent used, and the looping of the sorbent around the system, provide the advantages of the system being capable of high volume gas capture and continuous use. Another advantage of embodiments is that the heating to regenerate the sorbent is indirect and this results in substantially pure captured gas being output from the system. In addition, the heating for the regeneration process can be achieved without pure oxygen as well as additional air being required and this is less expensive than known techniques.

Embodiments are described in detail below with reference to a CCS system. However, it should be noted that embodiments include both the capture of other gases as well as other applications.

For example, embodiments include the capture of gases in addition, or as an alternative, to carbon dioxide, such as one or more of hydrogen sulphide, sulphur dioxide and Nitrogen dioxide.

Embodiments are also in no way limited to PCCC in fossil fuel-fired power plants and the cleaned gas can be generated by other processes than combustion (i.e. the cleaned gas does not need to be a flue gas). Embodiments include cleaning gases in industries such as the power generation industry, the metal production industry, cement production industry and mineral processing industry. In particular, embodiments can be used to clean gases from cement production processes, blast furnace processes, steel production processes and reforming processes (e.g. for hydrogen production). Embodiments also include hydrogen sulphide capture from sour gas.

Figure 1:
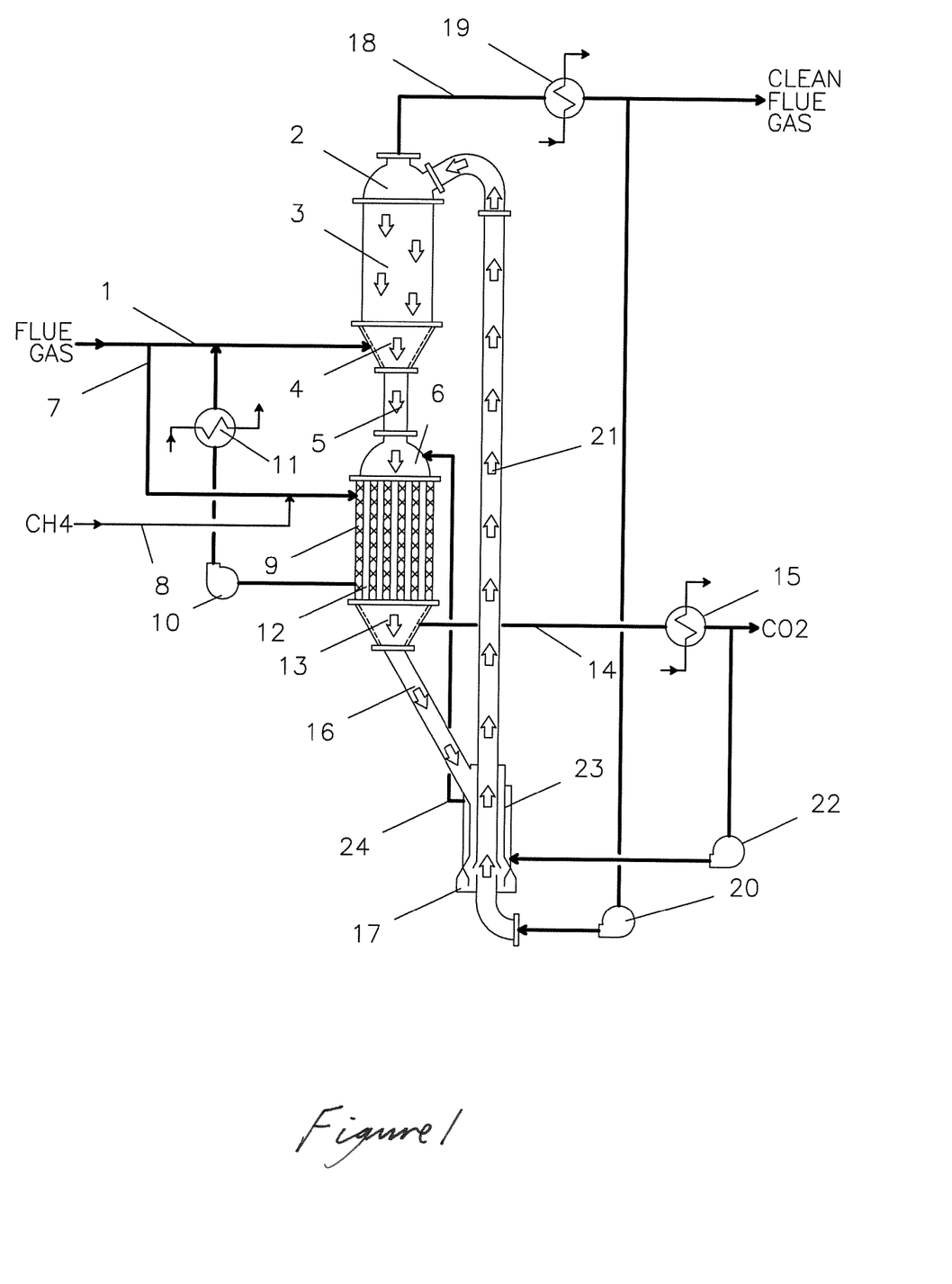
FIG. 1 shows a gas capture system according to a first embodiment of the invention.

FIG. 1 shows a gas capture system according to an embodiment. One application of the gas capture system of the present embodiment is as a PCCC system that has been retrofitted to a fossil fuel-fired power plant.

The gas capture system receives flue gas, i.e. combustion exhaust gas, that comprises carbon dioxide. Some, or all, of the carbon dioxide in the received flue gas is captured in a carbonator by a solid sorbent that is recirculated around the system so as to clean the received flue gas. The cleaned flue gas is then released into the atmosphere. The sorbent that captured the carbon dioxide is then heated in a calcinator. This process regenerates the sorbent and causes it to release carbon dioxide. The released carbon dioxide is then output from the system into, for example, a compression and liquefaction plant so that the carbon dioxide is not released into the atmosphere. The regenerated sorbent is then re-used to capture carbon dioxide from the received flue gas.

The solid sorbent, which is described in more detail later, preferably comprises both Calcium Oxide and Calcium carbonate. In the carbonator, Calcium Oxide reacts exothermically with carbon dioxide to form Calcium carbonate. In the regenerator, the Calcium carbonate is heated in an endothermic reaction that generates Calcium Oxide and carbon dioxide. There is therefore a temperature difference between the carbonator and calcinator and the solid sorbent undergoes gas capture and gas release processes cyclically due to the temperature swing. The sorbent may always be a mixture of Calcium Oxide and Calcium carbonate with the carbonator not converting all of the Calcium Oxide into Calcium carbonate and the calcinator not converting all of the Calcium carbonate into Calcium Oxide and carbon dioxide. The processes in the carbonator increase the amount of Calcium carbonate in the sorbent and the processes in the calcinator increase the amount of Calcium Oxide in the sorbent. The term sorbent may therefore refer to all of Calcium Oxide only, Calcium carbonate only and both Calcium Oxide and Calcium carbonate together.

The gas capture system of the present embodiment comprises a moving bed carbonator 3, a moving bed calcinator 12 and a fixed bed catalytic combustor 9 integrated with the moving bed calcinator.

Flue gas is received by the gas capture system and input to the carbonator 3 at a typical temperature of about 500-600° C. The normal temperature of the flue gas output from a power plant may be, for example, 550° C. However, the flue gas may be output from the power plant at a lower temperature, such as 80° C., and then input into a heat exchanger, such as a recuperator heat exchanger (also referred to herein as a recuperative flue gas heat exchanger), that raises the temperature of the flue gas. For example, the heat exchanger could also receive gas output from the carbonator at about 600-650° C. and use this to raise the temperature of the flue gas input to the carbonator to 500-600° C.

The flue gas is preferably input into the bottom of the carbonator with the flue gas output from the top of the carbonator. The solid sorbent is input into the top of the carbonator and output from the bottom of the carbonator. Advantageously, the flue gas and sorbent move through the carbonator in opposing directions. This counter flow provides a good mixing of the sorbent and the flue gas.

The sorbent that is input to the carbonator moves to the bottom of the carbonator where a valve/lock system, such as a loop seal, outputs only the sorbent from the carbonator without the flue gas in the carbonator also passing through the same output. The top of the carbonator comprises another valve/lock system that outputs only flue gas that has been cleaned due to a reaction with sorbent removing some, or all, of the carbon dioxide.

The sorbent is received by the carbonator at a temperature of about 400-800° C., preferably 500° C. to 700° C. and more preferably 500° C. to 600° C., and the temperature within the carbonator is 400° C. to 800° C., preferably 500-600° C. In the carbonator 3, Calcium Oxide in the sorbent reacts with carbon dioxide contained in the flue gas to form Calcium carbonate. Significant heat is generated by the exothermic carbonation reaction, and external as well as integrated heat exchangers may be provided to control the temperature and thereby maintain the carbonation reaction. The cleaned flue gas 18 output from the carbonator is preferably passed through one or more heat exchangers, such as a steam generator, before being released to the atmosphere. The carbonator may operate at about same temperature as the high pressure steam turbine of the power plant it is cleaning the gas from and so the heat extracted by the heat exchanger(s) can be efficiently used for energy production. The sorbent exits the carbonator as a solid mass flow through pellet transfer pipe 5 and is input to the calcinator.

The carbonator is preferably a moving bed reactor. The above-described counter current of flue gas and sorbent is also particularly advantageous. Solid sorbent is fed into the carbonator from the top of the carbonator while a stream of flue gas stream is fed in from the bottom. An advantage over a fluidized bed reactor is the improved consistency of the retention time of the sorbent. The particles of solid sorbent slowly move down the carbonator and exit the carbonator at the bottom of the carbonator's moving bed. This preferred approach also reduces attrition of the particles compared with fluidized beds.

In the calcinator, Calcium carbonate in the sorbent is calcinated by heating it to a temperature of 750-1000° C., preferably 800-900° C. The effect of the calcination process is for Calcium carbonate to endothermically decompose to generate Calcium Oxide and carbon dioxide. In order to obtain and maintain the reaction temperature of 800-900° C. in the presence of an endothermic reaction it is necessary for the calcination process to be heated. In the present embodiment, the calcinator comprises a fixed bed catalytic combustor 9 in the calcinator for generated the required heat for maintaining the calcination process. The combustion may generate heat by the combustion of any fuel but preferably a carbonaceous fuel is burned in the presence of combustion catalyst and either flue gas, air, or a mixture of flue gas and air. The flue gas would be obtained from the same source of flue gas as the flue gas received by the carbonator and the flue gas may already comprise Oxygen, or may not comprise a substantial amount of Oxygen. Advantageously, there is no need to add any pure Oxygen into the combustion process and this reduces costs as pure Oxygen is expensive. A further advantage is that the heating of the sorbent in the calcinator is indirect. In the calcinator, the sorbent is never in direct contact with the fuel combusted by the combustor and the products of the combustion process are not mixed with the sorbent or the carbon dioxide gas released by the sorbent. The output of the calcinator can therefore be substantially pure carbon dioxide.

The separation of the sorbent from the combusted fuel is arranged by retaining the sorbent in a plurality of tubes as the sorbent moves through the calcinator. The tubes are open at each end so that the tubes can receive and output the sorbent but the tubes are otherwise closed. The combustor heats the outside of the tubes and the sorbent within the tubes is thereby indirectly heated. The tubes are preferably elongate and linear. The calcinator is preferably a moving bed reactor. Sorbent is received by the calcinator and is input to ends of tubes that pass through the calcinator. The sorbent is heated as it moves through the inside of the tubes and this regenerates the sorbent. The sorbent, and carbon dioxide that has been generated by the regeneration of the sorbent, move co-currently to the other ends of the tubes to an output at the bottom of the calcinator.

At the output of the calcinator, the hot solid sorbent and carbon dioxide are separated by the gas-solid separation unit 13.

The catalyst used in the combustion process preferably comprises one or more of nickel, cobalt, Ru, Rh, Pd and Pt. The catalyst is preferably a Ni—Co mixed oxide. The catalyst is preferably any of the catalysts as disclosed in The International patent application with publication number WO/2013/150271, the entire contents of which are incorporated herein by reference.

The use of a Nickel Cobalt catalyst for total combustion at 1000° C. is a new technique. The catalyst has only previously been used for lower temperature applications at about 300° C. to 400° C.

Some, or all, of the outer surfaces of the tubes of in the calcinator and/or the inner surface of the combustor, which in the present embodiment is the housing of the calcinator, are preferably coated with the catalyst.

The separation of the sorbent from the combusted fuel in the calcinator may alternatively be arranged by the sorbent travelling around the outside of the tubes with the combustion process heating the inside of the tubes. In this embodiment, the catalyst is provided on the inner surface of the tubes. The tubes are also preferably aligned with their longitudinal axes substantially horizontal and arranged in a plurality of layers, that are preferably staggered, so that the sorbent can flow over the outer surface of at least one tube in each layer.

Embodiments also include the use of tubes that are not linear. Embodiments also include the calcinator not comprising tubes and instead comprising a plate heat exchanger, or any other technique, that separates the sorbent at the combustion process whilst providing heat to the sorbent.

Embodiments also include other techniques for separating the sorbent and carbon dioxide that may be used either in addition to the gas-solid separation unit 13 or as an alternative to the gas-solid separation unit 13. For example, above and/or below the calcinator perforated tubes may be provided for removing the carbon dioxide. The tubes could be arranged horizontally with perforations that are large enough for carbon dioxide to flow into the tubes but too small for sorbent to flow into the tubes. An end of the tube may be connected to a fan for sucking the carbon dioxide gas into the tubes.

The solid sorbent is output from the calcinator at about 900° C. It is then transported through the transfer pipe 16 and received by heat exchanger 23 integrated in the lift pot 17. The sorbent output from the calcinator may be passed through a heat exchanger so that its temperature is reduced from 900° C. to 600° C.

Substantially pure carbon dioxide is output from the calcinator at a temperature of about 900° C. Preferably, the carbon dioxide is cooled in heat exchanger 15 to an intermediate temperature of about 300-600° C. Part of the carbon dioxide is then taken off and input to heat exchanger 23. The rest of the carbon dioxide is cooled completely, compressed, liquefied and transported to storage in accordance with known handling procedures of captured carbon dioxide.

The heat exchanger 23 exchanges heat between carbon dioxide that has been cooled to a temperature of about 300-600° C. and solid sorbent at a temperature of about 900° C. The carbon dioxide is passed though the outer annulus of the heat exchanger 23 and the inner annulus of the heat exchanger 23 comprises the solid sorbent. In a preferred embodiment the heat exchanger 23 can operate as a pipe in pipe heat exchanger made part on the entrance channel for the lift pot 17. The solid sorbent is preferably arranged to move through the heat exchanger slowly and this increases the heat exchange between the carbon dioxide and sorbent.

As a result of the heat, carbon dioxide flows out of the heat exchanger 23 at a raised temperature of up to about 700-850° C. This flow of carbon dioxide is input to the sorbent input of the calcinator and advantageously helps to quickly raise the temperature of the sorbent as it enters the calcinator. The heat exchange in the lift pot also lowers the temperature of the sorbent output from the lift pot to about 580-600° C. The heat exchange in the lift pot uses the heat extracted from the sorbent as the sorbent is cooled for the purpose of heating the sorbent in the calcinator and this advantageously avoids the need for a heat exchanger directly between the sorbent in hot and cold parts of the gas capture system and increases the efficiency of the processes.

The sorbent output from the heat exchanger is input to the lift pot 17 installed at the bottom of a riser 21. The lift pot may be comprised by the bottom of the heat exchanger, as shown in FIG. 1, or a separate component of the system. The riser is a column that transports the sorbent back up to sorbent input of the carbonator. To move the sorbent from the bottom of the riser to the top, some of the clean flue gas that is output from the system is taken from the output of clean flue gas and input to the bottom of the riser through the lift pot. Preferably fan 20 is provided that blows the clean flue gas into the lift pot so that the flow of the clean flue gas in the riser can be controlled at an appropriate rate for raising the sorbent up through the riser. The sorbent is carried up through the riser by the clean flue gas that is input into the bottom of the riser and output at the top of the riser. The sorbent output from the top of the riser is input to the sorbent input of the carbonator so that the sorbent is recirculated around the system. The retention time of the sorbent in the riser is preferably in the range of 2 to 20 seconds. A short retention time in the riser and accurate temperature control of flue gas out of cooler 19 ensure that the temperature of the sorbent that is input to the carbonator is about 570° C.

Returning to the description of the combustor that provides the heat for the combustion process, the exhaust gases from the total combustion process are output from the combustor at a temperature of about 1000° C. In the present embodiment, the exhaust gases are cooled to a temperature of about 570-600° C. by a heat exchanger 11 and then input into the stream of flue gas input into the gas capture system and input to the carbonator. Advantageously, the carbon dioxide that is generated by the combustion that provides the heat required for the sorbent regeneration is also captured by the gas capture system. In the present embodiment, the combustor is comprised by the calcinator. Advantageously, this allows fast and efficient heat transfer from the combustion process to the sorbent regeneration process because the temperature difference between the combustion process and the regeneration process is reduced to a minimum when the combustor is integral with the calcinator.

It is not known in the prior art for the above-described catalysts to be used for combustion processes at the high temperature required for the combustion process, i.e. 1000° C., and the inventors have realised that such catalysts are particularly advantageous as total combustion catalysts in the total combustion processes of embodiments that require a temperature of 1000° C. to be maintained. The catalyst, minimises the fuel requirements. The combustion process is a reaction performed with a stoichiometric composition with all the carbonaceous fuel converted to carbon dioxide and steam. This gives minimum generation of additional flue gas. Besides, no extreme flame temperature will exist in the process as the combustion is heterogeneous and the catalyst surface is efficiently cooled by heat conduction in the metal substrate. In a conventional combustion process temperature would otherwise have to be controlled by an excess air to fuel ratio, giving a huge amount of flue gas and much less compact equipment.

The size, and therefore heat generation capability, of the combustor is scalable according to the power requirements of the sorbent regeneration process. An example of the heat generation requirement of the combustor is 200 MW. This would be generated by combusting about 4 kg/s of natural gas and 60 kg/s of air.

The sorbent according to embodiments is described in more detail below.

A particularly advantageous sorbent for carbon dioxide is a mixed oxide, in particular CaO, MgO and NaO based mixed oxide forms. A particular preferred sorbent are the sorbents as disclosed in International patent application with application number PCT/EP2006/003507, the entire contents of which are incorporated herein by reference.

The sorbent is comprised of solid particles. The particles may be small and substantially spherical balls and/or pellets (e.g. substantially cylindrical). The active component of the sorbent, for example Calcium Oxide or Calcium carbonate, is preferably combined with a binding agent.

The capture and release of the gas by the sorbent is due to reaction of the sorbent with the gas. The reactions may be adsorption and desorption processes or by other processes that result in the capturing of a gas.

Embodiments include the capture of other gases than carbon dioxide, in particular the capture of hydrogen sulphide from sour gas. A suitable sorbent for the capture of hydrogen sulphide is one or more of MnO, CuO and ZnO.

Embodiments also include the use of a mixture of different sorbents so that more than one gas is captured by the gas capture system. For example, different sorbent particles for carbon dioxide and hydrogen sulphide could be mixed and then used together. The gas capture system would then capture both carbon dioxide and hydrogen sulphide from a gas stream.

The sorbent changes between a used form and a regenerated form as it is recirculated about the system. The term sorbent refers generally to particles of the sorbent at any point in the sorbent cycle and may refer to the sorbent when it is in either its used form or regenerated form. In addition, as described above, the sorbent at any point in the sorbent cycle may always be a mixture of particles of the sorbent in the used form and in the regenerated form. The gas capturing and sorbent regenerating processes just change the relative concentrations of the sorbent at a particular point in the sorbent cycle.

As can be bee seen from FIG. 1, a number of fans are provided in the gas capture system to ensure the correct flows of the gases and movement of the sorbent occur.

The variations in pressure around the sorbent cycle are not substantial but are sufficient to ensure that the correct flows of the gases and movement of the sorbent occur. The pressures within the system may be close to atmospheric pressure.

A person skilled in the art would be able to construct the new and inventive system according to embodiments using known materials and technologies. For example, at the sorbent outputs of the carbonator and calcinator there is a component in the system that allows separation of a solid sorbent and a gas. Such components and technologies for gas/solid separation are known In the first embodiment, as shown in FIG. 1, the heat exchanger 11 reduces the temperature of the exhaust gas from the combustor 9 from 1000° C. to 570° C. so that the exhaust gas can be inserted to the carbonator 3.

Figure 2:
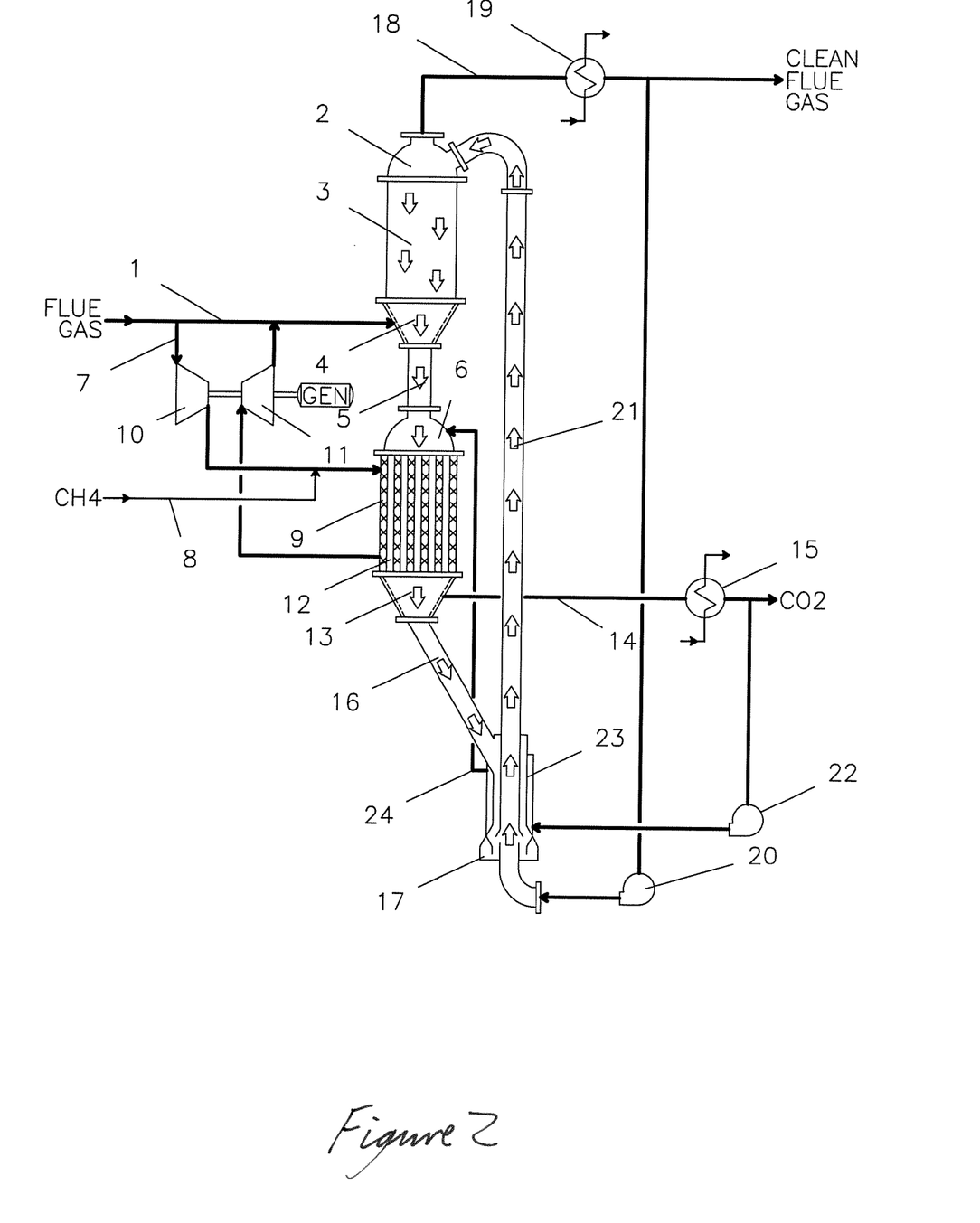
FIG. 2 shows a gas capture system according to a second embodiment of the invention.

A second embodiment is shown in FIG. 2. The second embodiment differs from the first embodiment in that a gas turbine is provided uses the hot exhaust gas from catalytic burner to produce electricity and also cause a temperature fall from 1000° C. to 570° C. The gas turbine preferably comprises a compressor so that the received flue gas by the turbine is compressed before being input to the catalytic combustor. The compression of the flue gas results in a high pressure combustion process. Advantageously, this reduces the required size of the combustor for supporting the combustion process.

Figure 3:
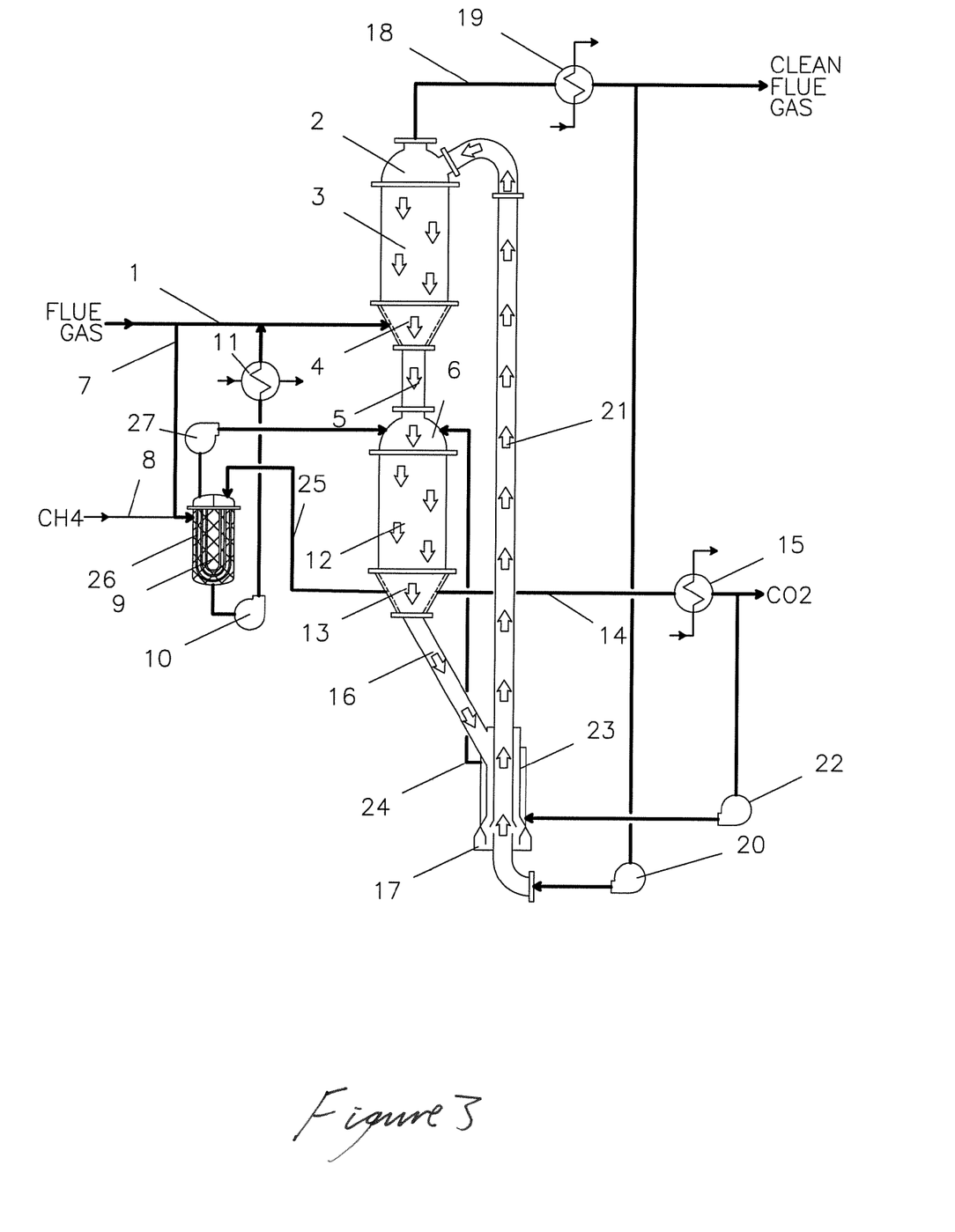
FIG. 3 shows a gas capture system according to a third embodiment of the invention.

A third embodiment is shown in FIG. 3. The third embodiment differs from the first embodiment in that the catalytic combustor is separate from the calcinator. Heat is transferred from the combustor to the calcinator by carbon dioxide gas. Some of the carbon dioxide gas generated in the calcinator is recirculated into a heat exchanger inside the catalytic combustor where the carbon dioxide gas is heated. The carbon dioxide gas in then input into the top of the calcinator and used to provide the heat for the sorbent regeneration. Advantageously, the size of the calcinator is decreased as it does not comprise the combustor and the system can be more flexibly implemented.

In an alternative implementation of the third embodiment heat is transferred from the combustor to the calcinator by a heat pipe that may comprise, for example, liquefied sodium, liquefied air or liquefied helium. Preferably a pumped loop of helium is used because helium does not cause corrosion.

In an alternative implementation of the third embodiment a gas turbine is provided instead of heat exchanger 11 in a similar manner to the second embodiment. The catalytic combustor will then effectively replace the combustion chamber of a conventional gas turbine.

Figure 4:
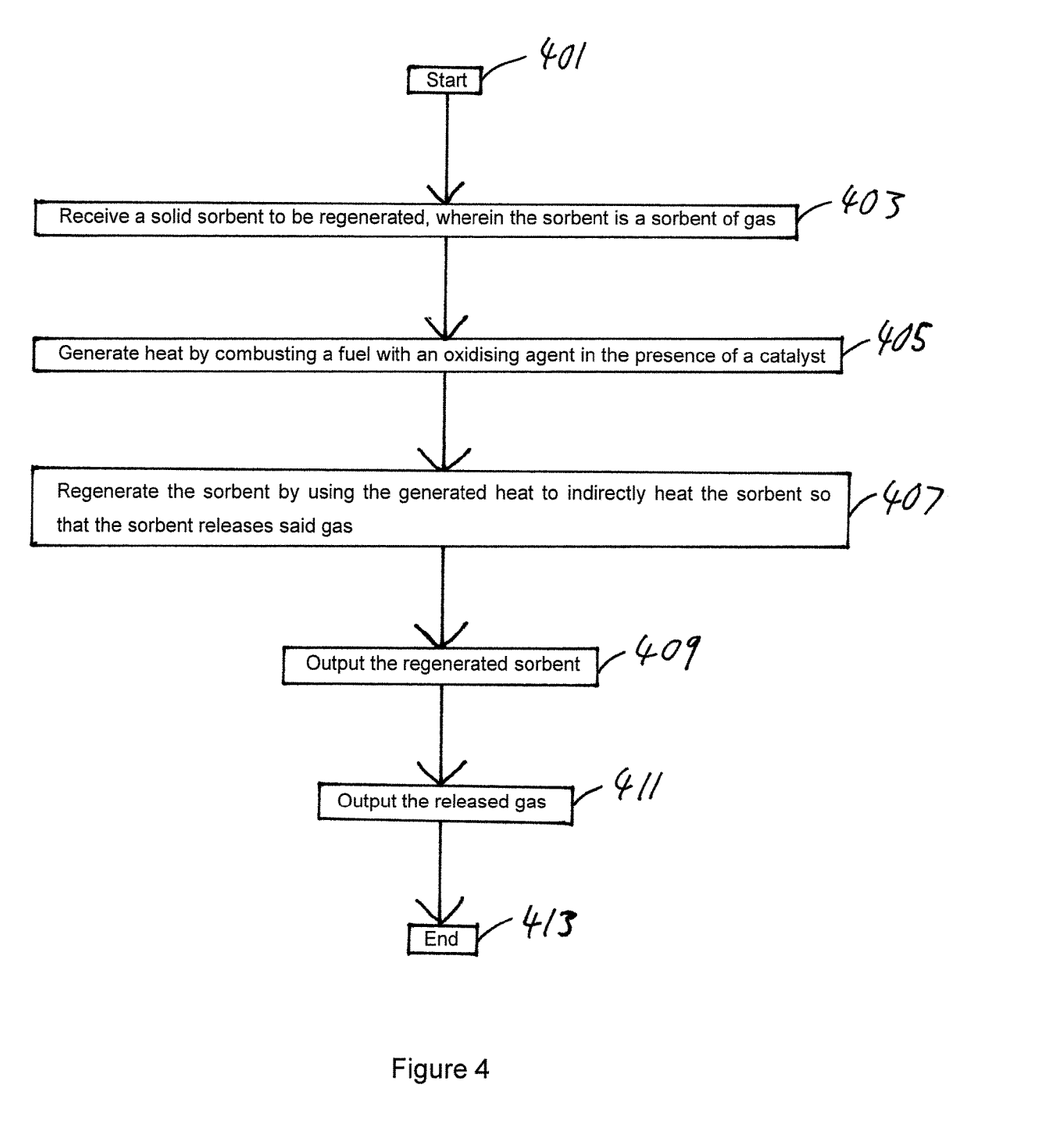
FIG. 4 is a flowchart of an embodiment of the invention.

FIG. 4 is a flowchart of a process according to an embodiment.

In step 401, the process begins.

In step 403, a solid sorbent to be regenerated is received, wherein the sorbent is a sorbent of gas.

In step 405, heat is generated by combusting a fuel with an oxidising agent in the presence of a catalyst.

In step 407, the sorbent is regenerated by using the generated heat to indirectly heat the sorbent so that the sorbent releases said gas.

In step 409, the regenerated sorbent is output.

In step 411, the released gas is output.

In step 413, the process ends.

Figure 5:
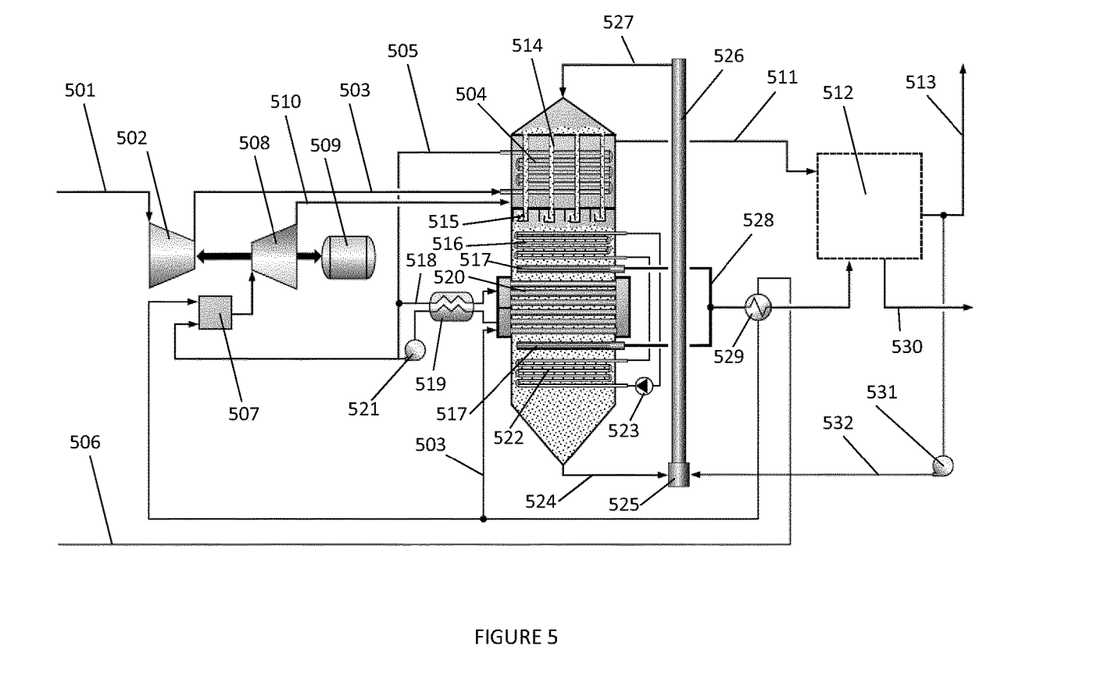
FIG. 5 shows a gas capture system according to a fourth embodiment of the invention.
Figure 6:
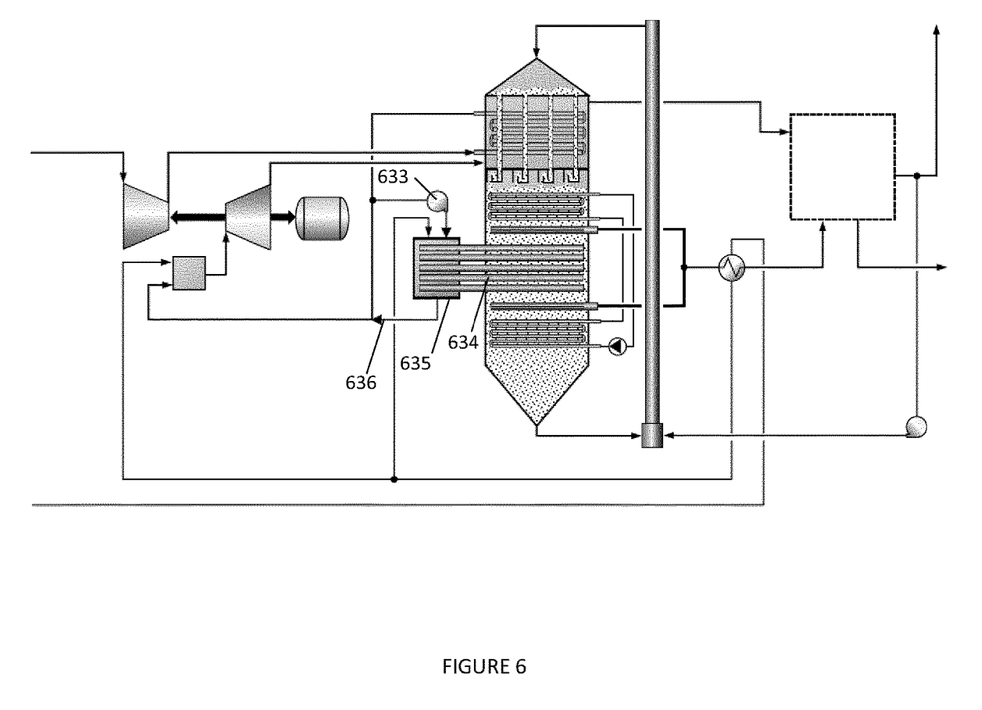
FIG. 6 shows a gas capture system according to a fifth embodiment of the invention.
Figure 7:
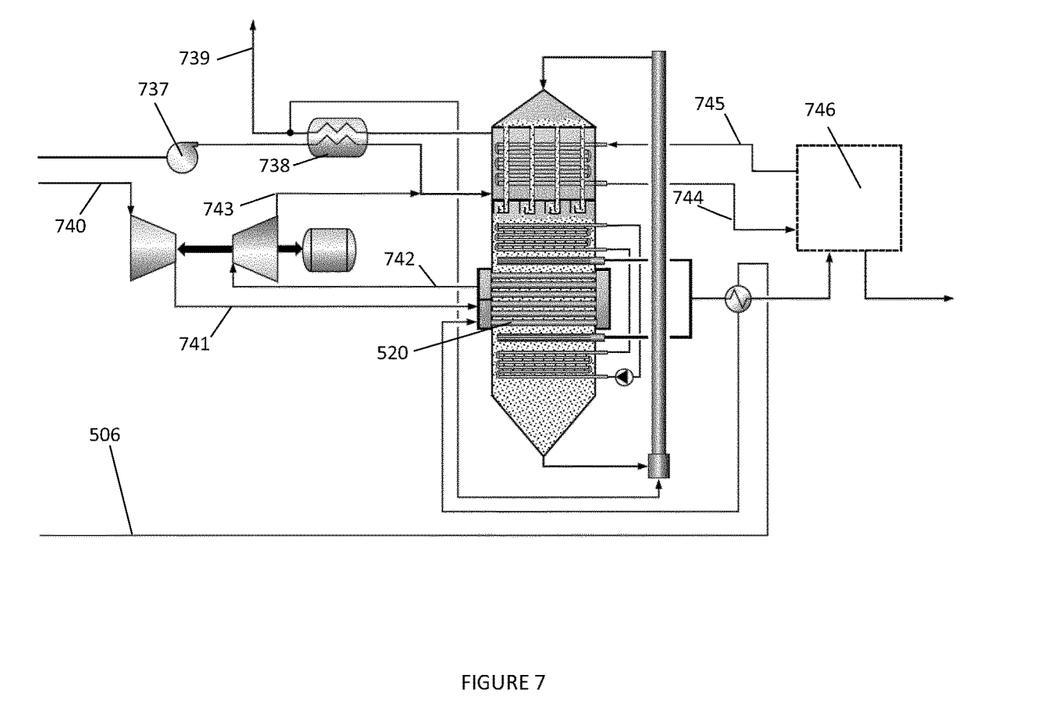
FIG. 7 shows a gas capture system according to a sixth embodiment of the invention.

The following reference signs are provided throughout FIGS. 1 to 3:

1—Is a flow of dirty flue gas
2—Is a sorbent input to a carbonator and clean flue gas output form a carbonator
3—Is a moving bed reactor inside a carbonator
4—Is a sorbent output from a carbonator and dirty flue gas input to a carbonator
5—Is connection between a carbonator and a calcinator that allows solid sorbent to move therebetween
6—Is a sorbent and gas input to a calcinator
7—Is a flow of dirty flue gas
8—Is a fuel input to a combustor that generates heat for a calcination process
9—Is a combustor which may be integrated with a calcinator or external from a calcinator
10—Is a fan
11—Is a heat exchanger or gas turbine
12—Is a calcinator
13—Is a sorbent and gas output
14—Is a flow of substantially pure carbon dioxide gas
15—Is a heat exchanger
16—Is connection between a calcinator and a lift pot that allows solid sorbent to move therebetween
17—Is a lift pot
18—Is a flow of clean flue gas
19—Is a heat exchanger
20—Is a fan
21—Is a riser
22—is a fan
23—Is a heat exchanger
24—Is a flow of carbon dioxide gas
25—Is a flow of carbon dioxide gas
26—Is a heat exchanger
27—Is a fan FIGS. 5 to 7 show implementations according to respective fourth to sixth further embodiments.

In the first to third embodiments the cabonator and calcinator are effectively separate units that are connected by the pipe 5. In the fourth to sixth embodiments the carbonator and calcinator are effectively integrated into a single unit, as shown in FIGS. 5 to 7. Accordingly, the carbonator and the calcinator as described for the fourth to sixth embodiments are separate regions of the same single unit.

FIG. 5 shows a fourth embodiment.

In FIG. 5, a supply of air to compressor is shown by 501. A compressor is shown by 502.

A carbonator cooler 504 is provided for reducing the temperature in the carbonator. A supply of compressed air to the carbonator cooler 504 is shown by 503. The compressed air may be at a temperature of 400-500° C. The flow of air form the carbonator cooler is shown by 505, and may be at a temperature of 600-650° C.

A supply of cold carbonaceous gas, such as natural gas, is shown by 506. A burner 507 is provided, and the gas output from the burner is input to the gas turbine 508. The gas turbine 508 drives the generator 509. The flow of hot exhaust from the gas turbine to carbonator is shown by 510. The gas may be at a temperature of 600-650° C.

The flow of hot exhaust from carbonator is shown by 511. The hot exhaust gas may be at a temperature of 600-650° C. A steam cycle 512 is provided that receives the gas flow 511 from the carbonator. The steam cycle 512 may comprise one or more steam generators, turbines, condensers and pumps. A flow of cold exhaust to a stack is shown by 513.

A moving bed of solid sorbent in the carbonator is shown by 514. Loop seals 515 are provided for solid sorbent flow control out of the carbonator.

Pre-heater 516 is provided for heating the sorbent before they are input into the calcinator. The sorbent exits the carbonator as a solid mass flow and the pre-heater 516 increases the temperature of the sorbent from about 500-600° C. to about 800-900° C. Advantageously, the temperature of the sorbent is increased to, or substantially to, the operation temperature of calcinator prior to being input to the calcinator.

Perforated collection pipes 517 are provided for separating carbon dioxide from the sorbent. The perforated collection pipes may be provided above and/or below the calcinator. The pipes can be arranged horizontally with perforations that are large enough for carbon dioxide, or any other released gas by the sorbent, to flow into the pipes but too small for sorbent to flow into the pipes. An end of the pipes may be connected to a fan for sucking the gas into the pipes.

A slip stream of hot air that flows into catalytic combustor is shown by 518. Recuperative heat exchanger 519 is provided for the pre-heating of air that flows to the catalytic combustor.

Catalytic combustor 520 is provided for supplying heat to the calcinator. The catalytic combustor 420 may operate as described for any of the previous embodiments, for example any of the previously described combustants and catalysts may be used. The catalytic combustor 520 is comprised by the calcinator. The temperature of the combustion in the catalytic combustor 520 may be 950-1000° C.

The separation of the sorbent from the combusted fuel in the calcinator is preferably provided by the sorbent travelling around the outside of the tubes with the combustion process heating the inside of the tubes. In this embodiment, the catalyst is provided on the inner surface of the tubes. The tubes are also preferably aligned with their longitudinal axes substantially horizontal and arranged in a plurality of layers, that are preferably staggered, so that the sorbent can flow over the outer surface of at least one tube in each layer. Embodiments include the use of tubes for the combustants that are either linear or non-linear.

Embodiments also include the calcinator not comprising tubes and instead comprising a plate heat exchanger, or any other technique, that separates the sorbent at the combustion process whilst providing heat to the sorbent.

Blower 521, i.e. fan, is provided to control the flow of the exhaust from catalytic combustor 520. The exhaust gases are input to the burner 507.

Cooler 522 is provided for cooling the sorbent output from the calcinator. The cooler reduces the temperature of the solid sorbent from about 900° C. to 600° C. Circulation pump 523 is provided for a heat exchange loop between the cooler 522 and the pre-heater 516 that heats the sorbent.

The flow of sorbent from the output of the calcinator is shown by 514. Lift pot 525 and riser 526 are provided for returning the sorbent to the input flow 527 of sorbent to the carbonator so that the sorbent circulates around the system.

Outlet pipes 528 of carbon dioxide, at a temperature of about 900° C., are provided. Heat exchanger 529 is provided for pre-heating the cold carbonaceous gas by the hot carbon dioxide. The heat exchanger 529 reduces the temperature of the carbon dioxide to about 500-600° C. and, after the heat exchange, the carbon dioxide is cooled completely, compressed, liquefied and transported to storage in accordance with known handling procedures of captured carbon dioxide. A cooled flow of carbon dioxide to a compressor is shown by 530.

Blower 531 is provides a flow of cold flue gas 532 to riser. The flow of cold flue gas 532 carries the sorbent up through the riser.

FIG. 6 shows a fifth embodiment. The components, and operation of the components, of the system according to the fifth embodiment are substantially as shown and described for the fourth embodiment except that the catalytic combustor is separated from the calcinator. Heat is transferred from the catalytic combustor to the calcinator by heat pipes 634.

Blower 633, i.e. fan, is provided for supplying a hot air slip stream to the catalytic combustor 635. High temperature heat pipes 634 transfer heat from catalytic combustor 635 to the calcinator. The working fluid in the heat pipes 634 may be, for example, liquefied sodium, liquefied air or liquefied helium. Preferably a pumped loop of high pressure helium is used because helium does not cause corrosion.

The exhaust from the catalytic combustor 635 is shown by 635.

FIG. 7 shows a sixth embodiment. The components, and operation of the components, of the system according to the fifth embodiment are substantially as shown and described for the fourth embodiment except that the catalytic combustor effectively replaces the combustion chamber of a conventional gas turbine. In addition, the system is configured to receive a low temperature flue gas.

Flue gas fan 737 is provided for receiving a low temperature flue gas. The temperature of the flue gas may be about 80° C.

Recuperative flue gas heat exchanger 738 is provided for heating the received flue gas to about 450-550° C. The recuperative flue gas heat exchanger 738 also receives the output flow of cleaned gas from the carbonator that may have a temperature of about 600-650oC. The heat exchanger raises the temperature of the received flue gas. For example, the heat exchanger could raise the temperature of the flue gas input to the carbonator to 500-600° C. The flow of chilled cleaned gas to stack is shown by 739.

A flow of air to the compressor is shown by 740.

A flow of compressed air to the catalytic combustor is shown by 741. The temperature of the compressed air may be 400-450° C.

A flow of exhaust from the catalytic combustor is shown by 742. The temperature of the exhaust gas may be 950-1050° C. The gas flow 742 is input into a turbine.

The gas flow out of the turbine is shown by 743 and is input into the carbonator. The gas turbine directly receives the flue gas output from the catalytic combustor. The catalytic combustor therefore effectively replaces the combustion chamber of a conventional gas turbine and this is advantageously an efficient way to reclaim energy from the exhaust of the catalytic combustor.

A flow of coolant from a carbonator cooler to steam generator 746 is shown by 744. The temperature of the flow 744 may be 600-650° C.

A flow of coolant from the steam generator to the carbonator is shown by 745. The flow 745 may have a temperature of 400-500° C.

The implementation of any one of the embodiments described herein may include the techniques of any of the other embodiments. That is to say, any embodiment may also include alternatively, or additionally, applying any of the techniques as described for any other embodiment.

Embodiments include a number of modifications and variations to the embodiments as described above.

In the above described embodiments, the flow of the flue gas through the carbonator is in counter-flow with the flow of the sorbent.

The design of the calcinator is not limited to that as described above and it may alternatively have any other design that allows the described indirect heating of the sorbent. In particular, tubes are not limited to being linear and may alternatively be coiled or have other shapes. The calcinator may alternatively have a stacked plate design with sorbent sliding along the outside of heated plates. In addition, there may only be a single tube through the calcinator and not a plurality of tubes.

The calcinator may alternatively be designed as a rotating drum. The sorbent particles move through the inside of the drum and the heating is applied to the outside of the drum as in a conventional cement kiln and/or through internal heating tubes, hollow discs or flights.

In the above-described embodiments, an annular shaped heat exchanger is integrated as part of the entrance channel for solids above the lift pot that cools the sorbent output from the calcinator. Embodiments also include a not having a heat exchanged lift pot as described and instead having an alternative implementation of heat exchanger for reducing the temperature of the sorbent. For example, embodiments include the riser that transports the sorbent from the output of the calcinator to the input of the carbonator being a heat exchanger. The riser could receive water at the bottom of the heat exchanger and output steam at the top of the heat exchanger with the sorbent cooled to the appropriate temperature of 570-600° C. by the heat exchange with the water.

In all of the above-described embodiments, in particular those in which a gas turbine is not provided for directly generating electricity from the exhaust gas from the burner, it is preferable that a compressor is provided that compresses the fuel and oxidising agent that is input to the combustor. Advantageously, by performing the combustion under high pressure the size of the combustor can be reduced.

In the above-described embodiments, the combusted gases in the combustor are flue gas and a carbonaceous fuel such as methane. Embodiments include the use of other fuels and oxidising agents. In particular, the combusted gases may include air and a carbonaceous fuel such as methane, syngas, natural gas or biogas. Preferably, there is no addition of pure Oxygen into the combustion process.

In the second, third and fifth embodiment as described above heat is transferred between the combustor and the calcinator by cycling a working fluid from the output of the calcinator to the input of the calcinator via a heat exchanger in the combustor. Embodiments also include any mechanism for transferring heat between the combustor and calcinator such as heat tubes, that may comprise liquefied sodium, liquefied air or liquefied helium, high temperature heat pipes or thermosiphons. Preferably a pumped loop of high pressure helium is used because helium does not cause corrosion.

Embodiments have been described with the sorbent capturing a gas at about 570-600° C. and then being regenerated at about 900° C. However, embodiments of the gas capture system also include gas capture and sorbent regeneration at lower temperatures. The sorbents according to embodiments may therefore be intermediate or low temperature sorbents.

Preferably, the combustion process in the combustor is a total combustion.

However, embodiments also include the combustion process not being a total combustion.

In the above described embodiments the exhaust gas from the combustor is input to the calcinator via a heat exchanger or a turbine. Embodiments include the exhaust gas being input to any part of the sorbent cycle. In particular, embodiments include the exhaust gas being input to the bottom of the riser and used to raise the sorbent in the riser instead of clean flue gas.

In the above described embodiments, temperatures and temperature ranges are provided. These are approximate. In particular, the temperature of sorbent and carbon dioxide output from the calcinator may be in the range 700° C. to 1000° C.

Although embodiments have been presented with the gas to be cleaned being flue gas, embodiments may be used with any gas and are not restricted to being a flue gas from a combustion process. The gas to be cleaned may be referred to as a dirty gas. The dirty gas may be sour gas directly output from a well head. The sour gas would be cleaned by capturing the hydrogen sulphide content. Embodiments also include cleaning gases in industries such as the power generation industry, the metal production industry, cement production industry and mineral processing industry. In particular, embodiments can be used to clean gases from cement production processes, blast furnace processes, steel production processes and reforming processes (e.g. for hydrogen production).

In the above described embodiments, the carbonator and calcinator are both moving bed reactors. However, embodiments also include the carbonator and calcinator both being fluidised bed reactors, CFBs. In CFB reactors, the solids and gas are mixed well and this advantageously results in excellent heat and mass transfer characteristics. However, this can also cause significant attrition of sorbent particles and erosion of the reactor vessel and internal components. Particularly preferred embodiments therefore include the use of counter current moving bed reactors. In these reactors, solid sorbent is fed in from the top while a gas stream, that is at a lower in flow rate in comparison to a fluidized bed operating under similar solids flow rate, is fed from the bottom. These solid particles slowly move down the reactor and are withdrawn from the bottom of the bed. In addition to providing near counter-current contacting, this approach also reduces attrition of the particles compared with fluidized beds and therefore has strong potential for post combustion CO2 capture applications.

Embodiments are appropriate for industrial scale processes. In particular, embodiments are particularly appropriate for providing a gas capture system that captures carbon dioxide gas generated by a power station. This includes all types of power station that generate carbon dioxide gas. All of the components of the gas capture system of embodiments are scalable such that the gas capture system is suitable for both capturing gas from the power stations that are the largest generators of carbon dioxide gas as well a power stations that are relatively small generators of carbon dioxide gas.

Another application of embodiments is in a hydrogen production process. It is known for hydrogen to be produced by sorption-enhanced reforming, SER. In this process methane and steam are converted to hydrogen and carbon dioxide ($CO_2$). Embodiments improve on known techniques for separating the generated hydrogen and $CO_2$ in order to obtain substantially pure hydrogen.

According to embodiments, the methane and steam reaction is performed in the presence of calcium oxide (CaO) and a catalyst. The CaO reacts with the generated $CO_2$ in order to generate $CaCO_3$ and leave hydrogen as the remaining gas.

Embodiments include looping a sorbent, which comprises CaO and/or $CaCO_3$, between a SER reaction chamber, in which hydrogen and carbon dioxide are generated, and a calcinator according any of the above described embodiments. The sorbent adsorbs carbon dioxide in the SER reaction chamber and, when the sorbent is regenerated in the calcinator, the carbon dioxide is released.

The flow charts and descriptions thereof herein should not be understood to prescribe a fixed order of performing the method steps described therein. Rather, the method steps may be performed in any order that is practicable. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

The invention claimed is:

1. A method of regenerating a sorbent of gas in a capture process of said gas, wherein the capture process comprises recirculating the sorbent between a gas capturing system and regenerating reactor system, the method comprising the regenerating reactor system performing the steps of:
receiving a solid sorbent to be regenerated, wherein the sorbent is a sorbent of carbon dioxide gas;
generating heat by combusting a fuel with an oxidising agent in the presence of a catalyst;
regenerating the sorbent by using the generated heat to indirectly heat the sorbent so that the sorbent releases carbon dioxide gas;
outputting the regenerated sorbent; and
outputting the released carbon dioxide gas;
wherein the received sorbent comprises a metal carbonate and the regenerated sorbent comprises a metal oxide, and
wherein the regenerating reactor system comprises a moving bed reactor;
wherein the regenerating reactor system comprises:
a sorbent input that receives the sorbent; and
a sorbent output that outputs the regenerated sorbent;
wherein the moving bed reactor comprises a plurality of tubes that provide the generated heat to the moving bed reactor;
the tubes are arranged in a plurality of horizontally aligned staggered layers; and
the sorbent travels around the outside of the tubes as it moves from the sorbent input to the sorbent output.

2. The method according to claim 1, wherein the sorbent comprises a binding agent.

3. The method according to claim 1, wherein in said step of generating heat by combusting a fuel with an oxidising agent in the presence of a catalyst, pure oxygen is not input to the combustion process.

4. The method according to claim 1, wherein the catalyst comprises one or more of Ni, Co, Ru, Rh, Pd and Pt.

5. The method according to claim 1, wherein the combustion of the fuel with the oxidising agent is total combustion.

6. The method according to claim 1, wherein the regenerating reactor system comprises a first system and a second system that is separate from the first system;
the step of generating heat by combusting a fuel with an oxidising agent in the presence of a catalyst is performed by the first system;
the step of regenerating the sorbent is performed by the second system; and
the method comprises transferring heat from the first system to the second system, wherein heat is transferred from the first system to the second system by a heat loop; wherein the heat loop comprises one or more of liquefied helium, air, carbon dioxide or sodium.

7. The method according to claim 1, wherein the step of regenerating the sorbent comprises heating the sorbent to a temperature in the range 750° C. to 1000° C.

8. A regenerating reactor system for regenerating a sorbent of gas in a gas capture system, wherein the gas capture system is configured to capture said gas by recirculating the sorbent between a gas capturing system and the regenerating reactor system, wherein the regenerating reactor system comprises:
a sorbent input for receiving a solid sorbent to be regenerated, wherein, when the regenerating system is in use, the sorbent is a sorbent of carbon dioxide gas;
a combustor for generating heat by combusting a fuel with an oxidising agent in the presence of a catalyst;
a moving bed reactor for regenerating the sorbent by using the heat generated by the combustor to indirectly heat the sorbent so that the sorbent releases carbon dioxide gas;
a sorbent output for outputting the regenerated sorbent; and
a gas output for outputting the released carbon dioxide gas;
wherein, when the system is in use, the received sorbent comprises a metal carbonate and the regenerated sorbent comprises a metal oxide, and wherein the moving bed reactor comprises:
a plurality of tubes that provide the generated heat to the moving bed reactor;
the tubes are arranged in a plurality of horizontally aligned staggered layers; and
the sorbent travels around the outside of the tubes as it moves from the sorbent input to the sorbent output.

9. The system according to claim 8, wherein the moving bed reactor is separate from the combustor; and
the system comprises conduits for carrying a fluid between the moving bed reactor and combustor so as to transfer heat from the moving bed reactor to the combustor.

10. A gas capture system for capturing a gas from a mixture of a plurality of gases, the system comprising:
- a gas input arranged to receive a mixture of a plurality of gases;
- a gas capturing system configured to use a sorbent to capture a gas within the received mixture of a plurality of gases;
- an output arranged to output gas that has had a gas captured from it by the gas capturing system;
- a regenerating reactor system, wherein the regenerating reactor system is configured to receive sorbent that has been used to capture a gas within the received mixture of a plurality of gases in the gas capturing system, regenerate the sorbent so that the sorbent releases the captured gas and output the regenerated sorbent;
- an output arranged to output the released gas during the regeneration of the sorbent by the regenerating reactor system; and
- a conduit that is arranged to provide a return path of the sorbent output from the regenerating reactor system to the input of the gas capturing system such that the sorbent is recirculated around the gas capture system;
- wherein the sorbent is a solid;
- wherein the regenerating reactor system comprises:
  - a sorbent input for receiving a solid sorbent to be regenerated, wherein, when the regenerating system is in use, the sorbent is a sorbent of carbon dioxide gas;
  - a combustor for generating heat by combusting a fuel with an oxidising agent in the presence of a catalyst;
  - a moving bed reactor for regenerating the sorbent by using the heat generated by the combustor to indirectly heat the sorbent so that the sorbent releases carbon dioxide gas;
  - a sorbent output for outputting the regenerated sorbent; and
  - a gas output for outputting the released carbon dioxide gas, and wherein the moving bed reactor comprises:
  - a plurality of tubes that provide the generated heat to the moving bed reactor;
  - the tubes are arranged in a plurality of horizontally aligned staggered layers; and
  - the sorbent travels around the outside of the tubes as it moves from the sorbent input to the sorbent output.

11. The gas capture system according to claim 10, wherein the gas capturing system is configured such that the flow of the sorbent in the gas capturing system is in contraflow with the flow of the received mixture of a plurality of gases in the gas capturing system.

12. The gas capture system according to claim 10, further comprising a heat exchanger system arranged to transfer heat between sorbent output from the regenerating reactor system and sorbent input to the regenerating reactor system.

13. The gas capture system according to claim 10, further comprising a heat exchanger system arranged to transfer heat between gas output from the regenerating reactor system and fuel for a burner and/or the combustor of the regenerating reactor system.

14. The gas capture system according claim 10, wherein the gas capture system is a post-combustion carbon dioxide capture system.

15. The gas capture system according to claim 10, wherein the gas capture system is configured to capture flue gas from a power plant.

16. The gas capture system according to claim 10, wherein the gas capture system is arranged to separate carbon dioxide gas from a mixture of carbon dioxide gas and at least hydrogen gas.

17. The method according to claim 1, wherein the catalyst for the fuel combustion is provided on the inner surfaces of the tubes.

18. The method according to claim 1, wherein the capture process is integrated with a gas turbine that drives a generator such that:
- the gas cleaned by the gas capturing system is exhaust gas from a burner of the gas turbine; and
- the reaction process in the gas capture system is cooled by compressed air that is supplied to the burner of the gas turbine.

* * * * *